Feb. 17, 1970     B. KAHANE     3,495,709
VIBRATING SEPARATOR FRAME HAVING IMPROVED DISCHARGE
Filed Aug. 4, 1967     2 Sheets-Sheet 1

*INVENTOR*
Bernard KAHANE

*ATTORNEYS*

INVENTOR
Bernard KAHANE

ATTORNEYS

United States Patent Office 3,495,709
Patented Feb. 17, 1970

3,495,709
VIBRATING SEPARATOR FRAME HAVING IMPROVED DISCHARGE
Bernard Kahane, Baie D'Urfe, Quebec, Canada, assignor to Separator Engineering Ltd., Montreal, Quebec, Canada, a corporation
Filed Aug. 4, 1967, Ser. No. 658,468
Int. Cl. B07b 1/28
U.S. Cl. 209—259        5 Claims

ABSTRACT OF THE DISCLOSURE

A vibrating separator employing screens through which fine material is caused to pass and more particularly to an improved discharge for coarse material disposed on the screen. The vibrating separator of the disclosure includes a wall of circular cross-section having an upper rim which is adapted to support a separator screen and trough means extending around the entire outer periphery of the wall and sloping downwardly from one or more points at or below the level of the rim and terminating in discharge means. With this arrangement the material which is fed onto the upper surface of the screen travels across the upper surface in a generally outward direction and the material which is unable to pass through the screen is able to pass from the screen at virtually any location around the periphery of the screen and fall onto the discharge means or trough.

Field of the invention

This invention relates to vibrating separators employing screens through which fine material is caused to pass and more particularly to an improved discharge arrangement for coarse material retained upon such screens.

Description of the prior art

In known separators of this kind, material is fed onto the upper surface of the vibrated screen and the vibrations cause the material to move in a generally outward direction for discharge at the outer edge of the screen. The screen is usually circular and the vibrations may be such that the material travels in a spiral path across the upper surface of the screen before reaching the periphery of the screen.

Upon reaching the periphery of the screen, the material encounters the casing of the separator, and is forced to travel around the separator in contact with the casing until it reaches one or more outlet spouts which are provided in the casing. The additional distance (circumferentially of the casing) which the material must travel on the screen surface can promote clogging of the screen with consequent trapping, in material which is unable to pass through the screen, of material which would otherwise have passed through the screen. In addition, the material tends to accumulate in mounds or heaps against the wall surrounding the screen and so inhibits the free movement of fresh material trying to reach the exit. The material is forced to navigate such mounds, slowing down the speed at which separation can be carried out and reducing the effective screening area and consequently the capacity of the screen. Thus, in these circumstances, the efficiency of separation is greatly impaired.

Summary of the invention

The present invention seeks to provide a discharge arrangement which permits a high rate of material discharge from the upper surface of the screen.

According to one aspect of the present invention, there is provided a frame unit for a vibratory separator, comprising a wall of circular cross-section having an upper rim adapted for supporting a separator screen, and trough means extending around the entire outer periphery of the wall, and sloping downwardly from one or more points at or below the level of said rim and terminating in discharge means.

Brief description of the drawings

For a better understanding of the invention, reference will now be made to the accompanying drawings in which.

Description of the preferred embodiment

Figure 1:
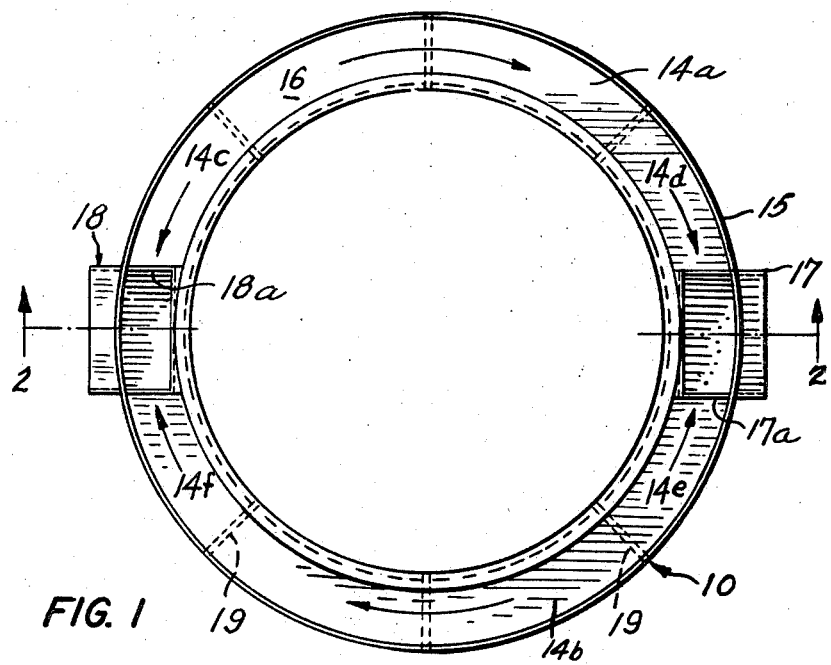
FIG. 1 is a plan view of a discharge or "launder" frame unit embodying the present invention.
Figure 2:
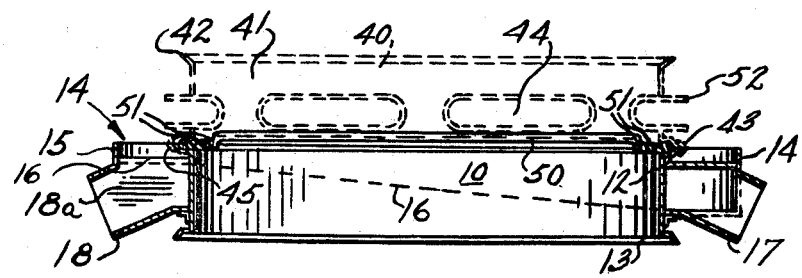
FIG. 2 is a cross-section on the line 2—2 of FIG. 1, showing in dotted lines the disposition of a separator screen and an additional frame.
Figure 3:
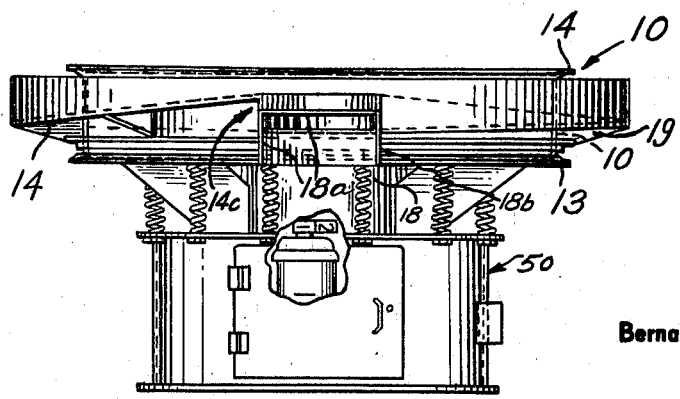
FIG. 3 is an elevation of the frame of FIG. 1, viewed toward the spout 18.

Referring firstly to FIGS. 1, 2 and 3, the discharge or launder frame 10 illustrated is, as will be seen from FIG. 1, generally circular in plan and includes a cylindrical wall element 11 having upper and lower peripheral flanges 12 and 13. The flanges 12 and 13 permit the launder frame 10 to be mounted, by means of clamping rings, in a vertical stack with other separator frame units. One such additional frame is shown in dotted lines in FIG. 2, which also illustrates the disposition and means of mounting of a separator screen between the frames. If reference is made, for example, to Canadian Patent No. 569,397 (Robert P. Miller et al.) issued Jan. 20, 1959, it will be seen that a number of such frames can be provided in the vertical array, appropriate pairs of flanges of which are fastened together by clamping rings having the peripheral edges of horizontal screens entered therebetween.

To the outside surface of the cylindrical element 11 there is welded or otherwise secured a two-part trough 14, each part 14a and 14b extending over approximately half the peripheral extent of the frame. Each part of the two-part trough 14 includes a vertical wall 15 and a bottom wall 16, the bottom wall 16 sloping as will be described in more detail hereinafter. At diametrically opposed locations of the frame, discharge spouts 17 and 18 are provided, these spouts communicating with the trough 14. The trough part 14a has its end 14c secured to a vertical element 18a which forms one side wall of the spout 18, the part 14a sloping downwardly away from its end 14c throughout its length and through almost 180° until, at its end 14d, it adjoins the spout 17. This slope can best be seen from FIGS. 2 and 3. The trough part 14a opens into the spout 17 as will best be seen from FIG. 2 so that material sliding, under the influence of the vibrations of the separator, downwardly along the trough part 14a, is discharged through the spout 17.

The trough part 14b has its highest end 14a attached to the side wall member 17a of the spout 17, and its lower end 14f opens into the spout 18. The trough portion 14b slopes downwardly throughout its length from the spout 17 to the spout 18.

Bracing elements 19 support the trough parts 14a and 14b. A vibratory means 50 is attached to the separator.

A suitable mounting arrangement for a separator screen and additional frame is shown in dotted lines in FIG. 2. Thus the additional frame 40 has a cylindrical wall element 41 similar to the wall element 11 of the lower frame and upper and lower flanges 42 and 43. Apertures 44 are formed along the circumference of the element 41 to allow free passage for coarse material held upon the screen, all the way around the periphery. The apertures are provided with spouts 52 which lead the material over the rim 12. The separator screen indicated by the dotted lines 50 is mounted at its rim by resin between tensioning rings 51, as is well known in the art and is gripped between the flange 43 of the upper frame and the flange 12 of the lower frame 11, the flanges being secured together by means of a clamping ring 45. The level of the screen 50 is raised slightly due to the shape of the tensioning rings 51 so as to be on a level with the bottom of the apertures 44, so that the coarse material retained on the screen 50 is allowed unimpeded passage through apertures 44 over the edge of the rim 12 substantially all the way around the unit.

It will be appreciated that the upper frame is an optional element. The separator screen may, if desired, be clamped straight on top of the flange 12 so as to lie flush therewith. It will be understood that material can be discharged at any point around the edge of the screen at substantially any point onto the bottom wall 16 of the trough, over the entire length of the trough portions 14a and 14b. Such material will then pass down the trough portions to the discharge outlets.

Figure 4:
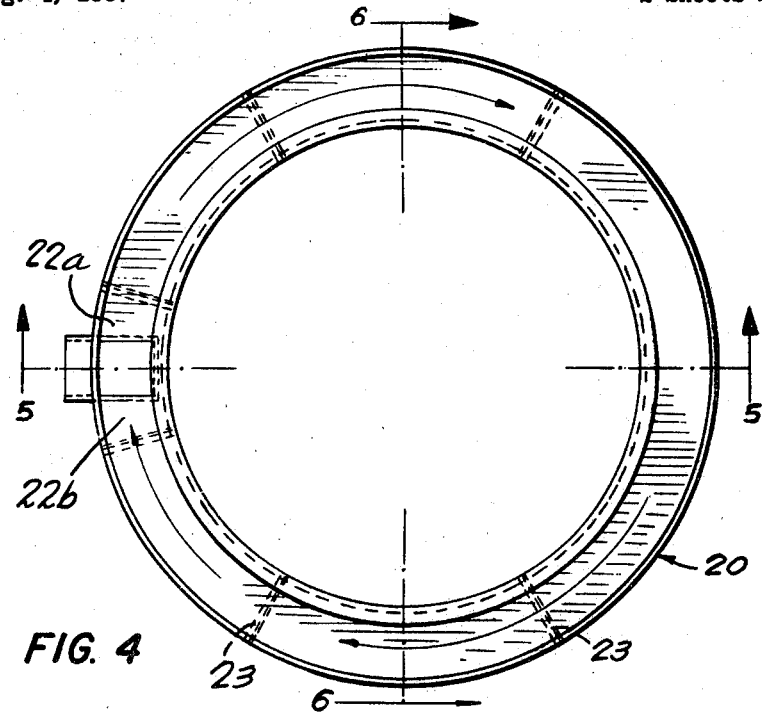
FIG. 4 is a top end view of a modified form of discharge frame according to the present invention.
Figure 5:
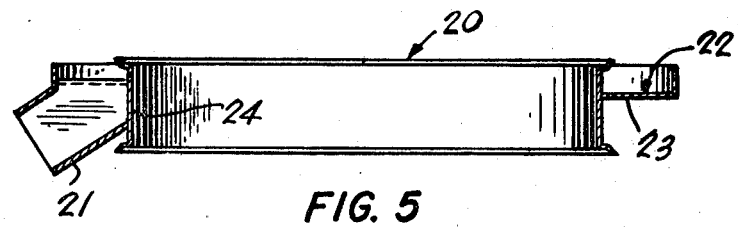
FIG. 5 is a cross-section on the line 5—5 of FIG. 4.
Figure 6:
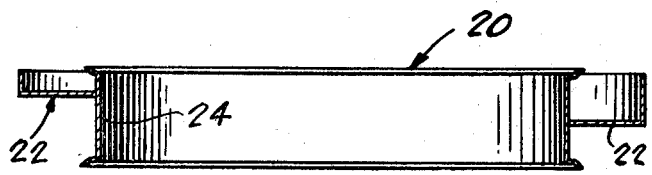
FIG. 6 is a cross-section on the line 6—6 of FIG. 4.

The discharge arrangement 20 illustrated in FIGS. 4, 5 and 6 differs from that of FIGS. 1, 2 and 3 in that it includes a single discharge spout 21 and a single trough, generally indicated at 22, which extends through almost the entire 360° extent of the discharge frame 20. The trough 22 is supported by triangular-shaped bracing elements 23 which project from the cylindrical portion 24 of the separator frame.

The trough 22 slopes throughout its length, the highest point being designated by the reference numeral 22a in FIG. 4, where the trough adjoins one wall of the spout, and the lowest point being designated by the reference numeral 22b in that figure. At this lowest point, the trough 22 opens into the spout 21.

The two separator frames described and illustrated, when incorporated in a vibrating separator of the type disclosed in, for example, U.S. Patent No. 2,284,671 issued June 2, 1942 to Meinzer, operate in substantially the same manner. Material is fed through an inlet (not shown) which is located vertically above the screen. As explained with reference to FIG. 2, the screen lies at approximately the level of the flange 12 and its periphery may be secured in place by being clamped to the flange 12 or between the flange 12 of the frame 10 and the next upper frame of the separator. The entire structure shown, and the parts rigidly connected thereto, are vibrated by an electric motor the rotating shaft of which carries eccentric weights. This is common procedure in the art. The material which is fed onto the upper surface of the screen travels across the upper surface in a generally outward direction with, as explained above, a spiral motion in some instances. The flow pattern across the upper surface of the screen is adjusted by varying the lead and mass of the weights of the drive motor of the separator. The material which is unable to pass through the screen is, with the constructions illustrated, able to discharge from the screen at virtually any location around the periphery of the screen and immediately fall onto the trough 14 or 22.

It will thus be understood that, once material which is incapable of passing through the screen reaches the edge of the screen, it does not have to travel through, for example, a 150° to 300° arc as was often necessary in prior art constructions, before it encounters a discharge spout. As explained above, this minimizes the risk of material heaping up around the edge of the screen and thus improves the efficiency of separation.

While frame units having one and two spouts have been illustrated, it would be within the scope of the invention to employ more than two with trough sections leading from one side of each one spout to the adjacent side of the next adjacent spout.

Furthermore, the use of radially directed spouts is not mandatory. The trough or trough sections may terminate, for example, in a tangentially directed discharge lip.

What is claimed:

1. A frame unit for vibratory separator, comprising an exposed cylindrical wall of circular cross-section having an upper rim adapted for supporting a separator screen, and trough means extending around the entire outer periphery of the wall and attached thereto, and starting from one or more points at or below the level of the said rim and terminating through a continuous path or paths of descending elevation in discharge means at an elevation lower than said trough starting point or points the innermost portion of said trough means being adjacent said wall with said trough means extending outwardly away from said wall whereby said trough means and said wall adapted for supporting a separator screen are adapted to be vibrated as an integral unit.

2. A frame unit according to claim 1, including a single discharge spout, said trough means extending from a portion overlying the spout and sloping downwardly around the periphery of the frame unit, and communicating at its downward end with said spout.

3. A frame unit according to claim 1 including a plurality of spouts located at spaced points around the outer surface of said wall, said trough means being made up of a plurality of sections, each one section extending from a portion overlying one spout downwardly and around said wall to the next adjacent spout and communicating at its downward end with said next adjacent spout.

4. In a vibratory separator including a frame unit having a wall of circular cross-section with an upper rim, a substantially horizontal level screen mounted to said unit in the region of said rim, and means for vibrating the screen and frame to move coarse material retained on said screen towards said rim, a discharge spout, the improvement comprising sloping trough means mounted to said frame unit and extending around the entire outer periphery of the frame unit for receiving said coarse material falling from said rim, the separator being arranged to allow free access of such coarse material over said rim substantially around its entire peripheral extent, said trough means extending from a portion overlying the spout and sloping downwardly therefrom around the periphery of the frame unit and communicating at its downward end with said spout.

5. The improvement of claim 4 wherein a second frame unit having a wall of similar cross-section to the first mentined unit is mounted over said first mentioned unit with said screen clamped between adjacent rims of the units, said second unit having peripheral openings in its wall adjacent the screen and distributed around the entire periphery of the wall so as to allow free access of said coarse material over the edge of said screen at substantially all points around said periphery.

References Cited

UNITED STATES PATENTS

| | | | |
|---|---|---|---|
| 279,286 | 6/1883 | Sutton | 209—350 X |
| 449,417 | 3/1891 | Hoyt | 209—350 |
| 656,102 | 8/1900 | Fjeld | 209—350 X |
| 1,478,761 | 12/1923 | Roosseau | 209—350 X |
| 1,717,902 | 6/1929 | Wiencke | 209—350 X |
| 1,979,500 | 11/1934 | Sniffin | 209—350 X |
| 2,563,249 | 8/1951 | Kohol | 209—270 |
| 2,676,706 | 4/1954 | Temple | 209—332 X |

FOREIGN PATENTS

| | | |
|---|---|---|
| 2,273 | 10/1854 | Great Britain. |
| 41,604 | 5/1887 | Germany. |
| 399,628 | 3/1909 | France. |

HARRY B. THORNTON, Primary Examiner

R. HALPER, Assistant Examiner

U.S. Cl. X.R.

209—363, 409